US010826409B2

(12) United States Patent
Lacaux et al.

(10) Patent No.: US 10,826,409 B2
(45) Date of Patent: Nov. 3, 2020

(54) ELECTRICAL ARCHITECTURE FOR CONTROLLING CONVERTERS AND AIRCRAFT COMPRISING THE ARCHITECTURE

(71) Applicant: THALES, Courbevoie (FR)

(72) Inventors: Frédéric Lacaux, Chatou (FR); Stéphane Guguen, Chatou (FR); Joël Devautour, Chatou (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/297,360

(22) Filed: Mar. 8, 2019

(65) Prior Publication Data

US 2019/0280617 A1    Sep. 12, 2019

(30) Foreign Application Priority Data

Mar. 8, 2018 (FR) ..................................... 18 00200

(51) Int. Cl.
*H02M 7/538* (2007.01)
*H02M 7/5387* (2007.01)
(Continued)

(52) U.S. Cl.
CPC ........ *H02M 7/53871* (2013.01); *B64D 41/00* (2013.01); *H02M 7/493* (2013.01);
(Continued)

(58) Field of Classification Search
CPC ............. H02M 7/53871; H02M 7/493; H02M 7/53873; H02M 2001/0009; H02P 27/08; B64D 41/00; B64D 2221/00
See application file for complete search history.

(56) References Cited

U.S. PATENT DOCUMENTS

| 2007/0024219 A1* | 2/2007 | Aoyagi | ................. H02J 7/1415 |
| | | | 318/139 |
| 2013/0241327 A1* | 9/2013 | Soma | ..................... H02K 5/225 |
| | | | 310/54 |

(Continued)

FOREIGN PATENT DOCUMENTS

| FR | 3050882 A1 | 11/2017 |
| WO | 2007/113312 A1 | 10/2007 |

OTHER PUBLICATIONS

Siemens, "Sinamics S120M Distributed Drive Technology", Dec. 31, 2014.

(Continued)

*Primary Examiner* — Kyle J Moody
*Assistant Examiner* — Lakaisha Jackson
(74) *Attorney, Agent, or Firm* — BakerHostetler

(57) ABSTRACT

An electrical architecture for controlling inverters and to an aircraft includes the architecture. The electrical architecture comprises: a plurality of converters capable of operating independently of one another, each converter being intended to power a charge, associated with each converter/charge pair: a charging loop, comprising at least one sensor measuring a parameter that is characteristic of the operation of the charge, an operation control module, receiving an operation setpoint of the charge and information originating from the operation sensor, the operation control module controlling a current setpoint of the considered converter so that the information originating from the operation sensor follows the operation setpoint. The operation control module is common to the converters.

14 Claims, 6 Drawing Sheets

| electrical architecture | 10 |
| load | 12 |
| inverter | 14 |
| terminal | 16,18 |
| branch | 21,22,23 |
| filtering module | 25 |
| close control module | 27 |
| pulse width modulator | 28 |
| binary command connection | 29 |
| duty cycle | 30 |
| current control module | 31 |
| current sensor | 32 |
| current loop | 33 |
| current setpoint | 34 |
| charging loop | 37 |
| control module | 35 |
| operation sensor | 36 |
| operation setpoint | 38 |
| memory | 35a |

(51) Int. Cl.
   *B64D 41/00* (2006.01)
   *H02M 7/493* (2007.01)
   *H02P 27/08* (2006.01)
   *H02M 1/00* (2006.01)

(52) U.S. Cl.
   CPC ........ *H02M 7/53873* (2013.01); *H02P 27/08* (2013.01); *B64D 2221/00* (2013.01); *H02M 2001/0009* (2013.01)

(56) References Cited

U.S. PATENT DOCUMENTS

| | | | |
|---|---|---|---|
| 2015/0023080 A1* | 1/2015 | Chambon | H02M 7/537 363/131 |
| 2016/0329705 A1 | 11/2016 | Lacaux et al. | |
| 2017/0250622 A1 | 8/2017 | Krolak et al. | |
| 2017/0288593 A1* | 10/2017 | Suzuki | H02M 3/158 |

OTHER PUBLICATIONS

Concept, "Description and Application Manual for 1SD536F2 SCALLE Plug-and-Play IGBT Drives", Jun. 7, 2007.
La Schneider, "Les techniques de commande du moteur asynchrone", Jun. 30, 1998.
European Search Report issued in European Patent Application No. 19 161 437.9 dated Apr. 7, 2020.

* cited by examiner

| | |
|---|---|
| electrical architecture | 10 |
| load | 12 |
| inverter | 14 |
| terminal | 16,18 |
| branch | 21,22,23 |
| filtering module | 25 |
| close control module | 27 |
| pulse width modulator | 28 |
| binary command connection | 29 |
| duty cycle | 30 |
| current control module | 31 |
| current sensor | 32 |
| current loop | 33 |
| current setpoint | 34 |
| charging loop | 37 |
| control module | 35 |
| operation sensor | 36 |
| operation setpoint | 38 |
| memory | 35a |

| | |
|---|---|
| load | 46 |
| terminal | 16,18 |
| close control module | 27 |
| pulse width modulator | 28 |
| current control module | 31 |
| current sensor | 32 |
| control module | 35 |
| operation sensor | 36 |
| converter | 40 |
| switch | 42 |
| diode | 43 |
| inductor | 44 |
| output network | 45 |
| filtering capacitor | 47 |

| | |
|---|---|
| load | 56 |
| terminal | 16,18 |
| close control module | 27 |
| pulse width modulator | 28 |
| current control module | 31 |
| current sensor | 32 |
| control module | 35 |
| operation sensor | 36 |
| converter | 50 |
| inductor | 51 |
| output network | 55 |
| switch | 52 |
| diode | 53 |

| | |
|---|---|
| load | 12 |
| inverter | 14 |
| close control module | 27 |
| pulse width modulator | 28 |
| current control module | 31 |
| current setpoint | 34 |
| charging loop | 37 |
| operation sensor | 36 |
| case | 65,66 |
| contactor | 68 |
| memory | 35a |

ELECTRICAL ARCHITECTURE FOR CONTROLLING CONVERTERS AND AIRCRAFT COMPRISING THE ARCHITECTURE

CROSS-REFERENCE TO RELATED APPLICATIONS

This application claims priority to foreign French patent application No. FR 1800200, filed on Mar. 8, 2018, the disclosure of which is incorporated by reference in its entirety.

FIELD OF THE INVENTION

The invention relates to an electrical architecture for controlling inverters. The invention is well adapted for an electrical network placed on board a vehicle. The invention is particularly useful in the aeronautical field where the current trend is to increase the amount of electrical equipment and therefore the on-board electrical power.

BACKGROUND

An aeroplane generally comprises many electric charges supplied with electrical power via an on-board electricity supply network. For example, the flight commands of the aeroplane, the air conditioning systems and the interior lighting implement alternating three-phase electric machines. The electrical energy supplied to these machines originates from power converters connected to an on-board network delivering electrical energy in direct or alternating form. The on-board network can comprise, for example, electrical generators, storage batteries, or even means for connecting to an electrical power supply network outside the aeroplane and allowing the aeroplane to be electrically powered when it is parked in an airport. Commonly, direct 540 V and/or alternating 115 V or 230 V, 400 Hz networks are found on board an aeroplane. In a known manner, the power converters receive energy from the on-board network in order to convert it into polyphase alternating energy adapted to the power and frequency requirements of the charge. When a converter is powered by an alternating network, the converter comprises, for example, a rectifier delivering a direct voltage, followed by an inverter producing the alternating voltage required for the charge on the basis of the direct voltage. When a converter is powered by a direct network, the converter then comprises a circuit fulfilling the function of inverter and producing the alternating voltage directly on the basis of the direct voltage of the on-board network. A converter can be dedicated to a charge or common to a plurality of charges.

The converters generally comprise electronic switches coupling the on-board network to the various phases powering the charge. The electronic switches are, for example, MOSFET (Metal Oxide Semiconductor Field Effect Transistor) transistors. IGBT (Insulated Gate Bipolar Transistor) transistors are also available.

The invention relates to the control of the switches belonging to the converters. The invention can be implemented regardless of the type of energy conversion. The converter can be powered by an alternating or direct network. The converter can deliver an alternating or direct voltage. The converter can be mono-directional or reversible.

Currently, electronic equipment is associated with each converter that allows it to be controlled. This equipment receives an operation setpoint of the charge powered by the converter and delivers signals directly powering the gates of the various switches of the converter. For a charge such as an electric motor, the operation setpoint can be, for example, the rotation speed of the motor or the torque that it has to deliver.

In numerous vehicles, and more specifically for aeroplanes, reducing on-board weight is a recurrent issue that arises. For example, attempts have been made to pool the converters. This pooling is disclosed, for example, in patent application WO 2007/113312 filed in the name of the applicant. In this document, the same converter can be used to power various charges. A switching system allows one or more converters to be assigned to one charge or to another depending on the instantaneous power requirement of the various charges.

SUMMARY OF THE INVENTION

The invention also relates to the pursuit of on-board weight reduction. To this end, the invention proposes a focus on the equipment for controlling converters and on pooling all or some of the converters. More specifically, the control equipment comprises an operational chain that is the focus of the invention. This chain is formed by a plurality of modules. The invention proposes pooling certain modules while keeping other modules dedicated to the inverter.

To this end, the aim of the invention is an electrical architecture, comprising:
- a plurality of converters capable of operating independently of one another, each converter being intended to power a charge;
- associated with each converter/charge pair: a charging loop, comprising at least one sensor measuring a parameter that is characteristic of the operation of the charge, an operation control module, receiving an operation setpoint of the charge and information originating from the operation sensor, the operation control module controlling a current setpoint of the considered converter so that the information originating from the operation sensor follows the operation setpoint, characterized in that the operation control module is common to the converters.

The operation control module can comprise a memory allowing storage of a plurality of control rules, each adapted to the operation of one of the converters.

The memory can be configured to store a charge curve adapted to a battery forming the charge associated with the converter.

The memory also can be configured to store a torque/speed curve adapted to start an electric motor forming the charge associated with the converter.

The memory also can be configured to store operation data for controlled switches and/or for the associated charge.

The module that is common to the various converters can comprise a real-time operating system enabling separation of channels associated with each of the converters.

The electrical architecture can further comprise:
- associated with each converter: a current loop, comprising at least one current sensor measuring an output current of the considered converter, a current control module, receiving the current setpoint and information originating from the current sensor and delivering an opening and closing duty cycle for electronic switches belonging to the considered converter, the current control module controlling the duty cycle so that information originating from the current sensor follows the current setpoint;

a control module comprising the operation control module and the current control module, the control module being common to the converters.

The electrical architecture can further comprise a pulse width modulator that is common to the converters, receiving a duty cycle and delivering binary commands to the converters for opening and closing electronic switches of the various converters. The control module that is common to the converters further comprises the pulse width modulator.

The electrical architecture can further comprise, associated with each converter, a switch control module, called close control module, receiving the binary commands and implementing current and voltage adaptation of the binary commands in order to generate signals adapted to the switches.

A link connecting the control module and the close control modules can be provided by means of optical fibres.

The operation control module can be disposed in a case. The converters are then each disposed in a case that is distinct from the case containing the operation control module.

The electrical architecture can further comprise at least one contactor distinct from the converters. The operation control module then controls the contactor.

A further aim of the invention is an aircraft, comprising an electrical architecture according to the invention. The operation control module is then disposed in a pressurized zone of the aircraft and at least one of the converters is disposed in a non-pressurized zone of the aircraft.

BRIEF DESCRIPTION OF THE DRAWINGS

The invention will be better understood, and further advantages will become apparent, upon reading the detailed description of an embodiment, which is provided by way of an example, which description is illustrated in the accompanying drawings, in which.

For the sake of clarity, the same elements will use the same reference signs throughout the various figures.

DETAILED DESCRIPTION

Figure 1:
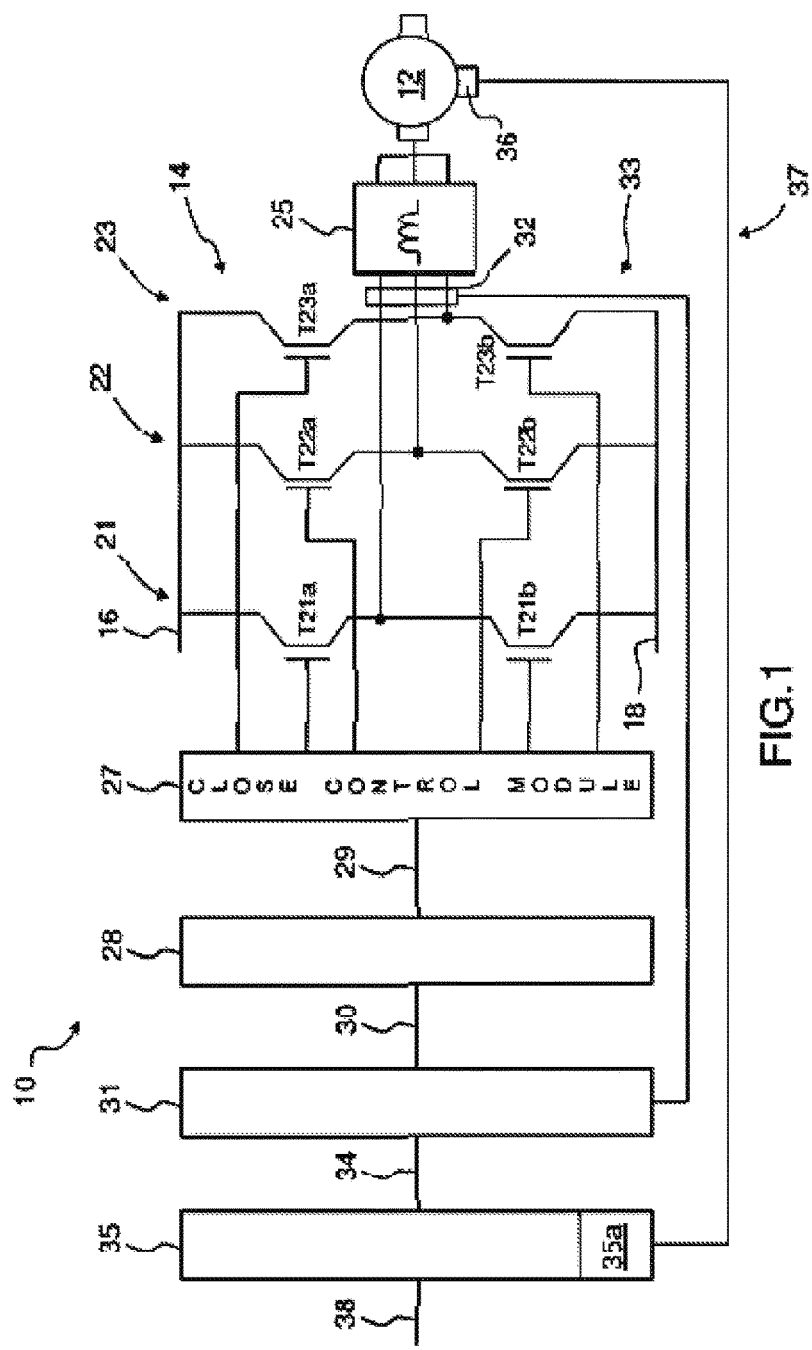
FIG. 1 schematically shows an inverter and its control equipment.

FIG. 1 shows an electrical architecture 10 allowing a charge, such as an electric motor 12, for example, to be powered. The electric motor requires a three-phase power supply supplied by an inverter 14. Any other type of electric charge powered with alternating current can be implemented within the scope of the invention. In the example shown in FIG. 1, the inverter 14 produces the three phases required to power the charge. The invention can be implemented for any type of inverter regardless of the number of phases that it delivers.

The inverter 14 takes electrical energy between two terminals 16 and 18 of a direct network. On board aircraft, a direct 540 V network can be present that allows the inverter 14 to be powered. This type of network is called HVDC (High Voltage Direct Current). Any other direct voltage also can be implemented within the scope of the invention.

The inverter 14 comprises three branches 21, 22 and 23, each producing one of the output phases of the inverter 14. Each branch comprises two electronic switches connected in series between the terminals 16 and 18 of the direct network; T21a and T21b for branch 21, T22a and T22b for branch 22 and T23a and T23b for branch 23. As previously mentioned, various types of switches can be implemented in the inverter 14, such as, for example, MOSFETs or IGBTs. For each branch, the corresponding phase is produced at the common point of the two switches of the branch. Free-wheeling diodes, not shown in the figure, can be connected in parallel with each switch. A filtering module 25 can be connected between the output of the inverter 14 and the charge 12. The filtering module 25 can comprise inductors for reducing common mode disruptions and differentials potentially present on the various phases.

In association with the inverter 14, the architecture 10 comprises a module 27 for controlling switches, often called close control module. The close control module 27 is directly connected to the gates of the electronic switches. The close control module 27 generates signals adapted to the switches on the basis of binary commands. The binary commands are generally two-level squarewave signals, one of the levels corresponds to the open state of the switch and the other level corresponds to the closed state of the corresponding switch. The close control module 27 performs current and voltage adaptation of the binary commands in order to generate signals adapted to the switches. The close control module 27 does not manage the durations during which the switches remain open or closed. The close control module 27 at most allows the duration for transition from one state to the other to be adapted in order to reduce any interference, while limiting any switching losses. The close control module 27 also can integrate a switch protection circuit. The close control module 27 is located in the immediate vicinity of the inverter 14 in order to prevent any inductance from occurring in the conductors connecting it to the various switches. Indeed, the presence of inductance could degrade the signals transmitted by the close control module 27. Such close control modules are commercially available, for example. One example is the control module referenced: CGD15HB62LP and offered by CREE, whose head office is located in the United States of America: 4600 Silicon Drive Durham, N.C., 27703.

The response time of the close control module is approximately 0.1 µs.

Upstream of the close control module 27, the architecture 10 comprises a pulse width modulator 28 delivering binary commands 29 to the close control module 27 for opening and closing electronic switches of the inverter 14. The pulse width modulator 28 determines the binary commands 29 on the basis of a duty cycle 30 that it receives. The duty cycle 30 is an image of the voltage with which the charge 12 is powered. The duty cycle 30 can be related to an operation setpoint of the inverter 14. The duty cycle 30 has a sinusoidal shape, for example. In order to determine binary commands 29 in two states, the modulator 28 compares, for example, the duty cycle 30 with a triangular signal that can be generated by the modulator 28 itself or by an external generator. When the duty cycle 30 is greater than the triangular signal, the binary command 29 is in a high state and when the duty cycle 30 is less than the triangular signal, the binary command 29 is in a low state. Of course, it is possible to implement other methods in order to define the binary commands 29 on the basis of the duty cycle 30.

The response time of the pulse width modulator 28 is approximately 1 µs.

Upstream of the pulse width modulator 28, the architecture 10 comprises a module 31 for controlling the current of the inverter 14. A current sensor 32 measures the output current of the inverter 14. The current sensor 32 can perform its measurement on one of the three phases or on the three phases simultaneously. The current sensor 32 can perform its measurements directly on the output of the branches 21, 22 and 23 of the inverter 14 or downstream of the filtering module 25. The module 31 and the sensor 32 form a control loop 33, called current loop, receiving a current setpoint 34. The current loop 33 modifies the duty cycle 30 so that the current delivered by the inverter 14 follows the current setpoint 34.

The response time of the module 31 for controlling the current of the inverter 14 is approximately 10 µs.

Upstream of the module 31, the architecture 10 comprises a module 35 for controlling the operation of the charge 12. An operation sensor 36 measures a parameter that is characteristic of the operation of the charge 12. This can involve the rotation speed of a motor or the torque that it delivers. It can involve any other physical parameter such as a pressure, a temperature, etc. The module 35 and the sensor 36 form a control loop, called charging loop 37, receiving an operation setpoint 38 of the charge 12. The charging loop 37 modifies the current setpoint 34 so that the parameter that is characteristic of the operation of the charge 12 follows the operation setpoint 38 of the charge 12.

The response time of the module 31 for controlling the module 35 for controlling the operation of the charge 12 is approximately 10 ρs.

It is possible to dispense with the current loop 33. The module 35 then delivers the duty cycle 30 directly.

The aim of the invention is to pool all or some of the equipment for controlling the inverter 14. In other words, with a single module consolidating various functions upstream of the inverter, it is possible to control a plurality of independent inverters. As previously mentioned, the inverters convert energy present in the form of a direct current into energy present in the form of an alternating current. The inverter 14 described with reference to FIG. 1 is shown in summary format. Within the scope of the invention, the inverters can be included in more complex converters. For example, a plurality of coupled inverters can operate in parallel in order to power the same charge.

The converters can be mono-directional, from the direct network to the charge operating in alternating mode, or reversible, i.e. allowing energy to be exchanged in both directions between a charge that can be regenerative and a network. By way of an example, a battery is both an energy consuming charge when it is recharged by the network and a source producing energy when it powers the network.

Numerous charges are present on board an aeroplane and all of them do not operate continuously. Some charges even operate for very short durations compared to the duration of a mission. By way of an example, the exciter associated with the electric machine intended to start the main engines of the aeroplane can be cited. This only operates for a brief period before take-off. It is also possible to cite the electric brakes, which only operate during landing to slow down the aeroplane rolling down the runway. Furthermore, some charges operate practically continuously, such as, for example, the cabin air conditioning system. However, the air conditioning system can be shut down for short periods without this being detrimental to the comfort of the occupants of the aeroplane. It is therefore possible to pool some equipment associated with the aforementioned electric charges. For example, it is possible to pool the control of the converters powering the exciters of the starters, the air conditioning system and the electric brakes. It is possible to provide sequential operation of the pooled control equipment, for one charge then for another. Alternatively, it is possible to cause them to operate in parallel at the same time for two independent charges.

The inverter 14 must be included as an operational block comprising controlled electronic switches allowing direct-alternating conversion. The control of the switches also can allow the inverter to have other operating modes, for example, reversible modes. The inverter can be controlled in order to reduce or increase the voltage. To this end, particular control rules can be stored in the control equipment of the inverter 14. These control rules are stored in a memory 35a of the control equipment and the equipment selects the control rule to be implemented on the basis of the inverter to be controlled. The memory 35a can belong to the module 35 for controlling operation. For example, the charge 12 can be an electric motor requiring a particular torque/speed curve so that it can be started. On board an aeroplane, the main engines and the auxiliary power unit (APU) are started by an electric motor requiring a particular torque/speed curve that is therefore worthwhile storing in the memory 35a.

Figure 2:
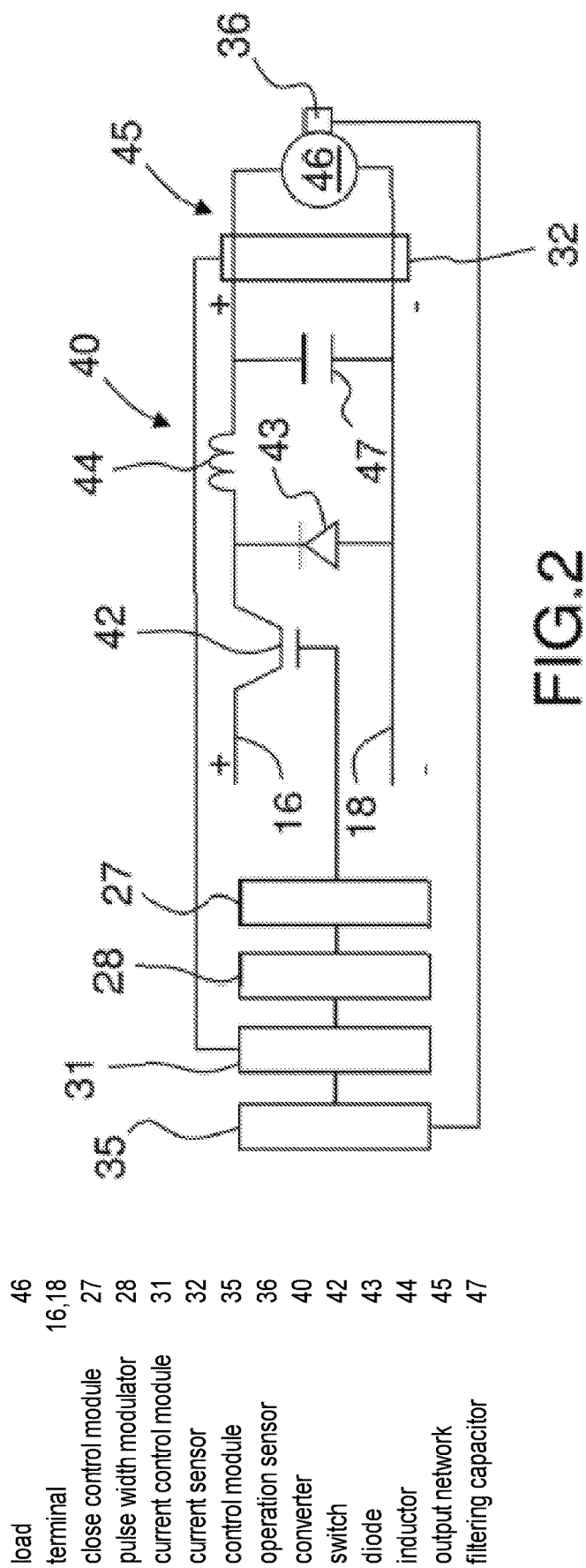
FIGS. 2 and 3 show two direct-direct converters and their control equipment.
Figure 3:
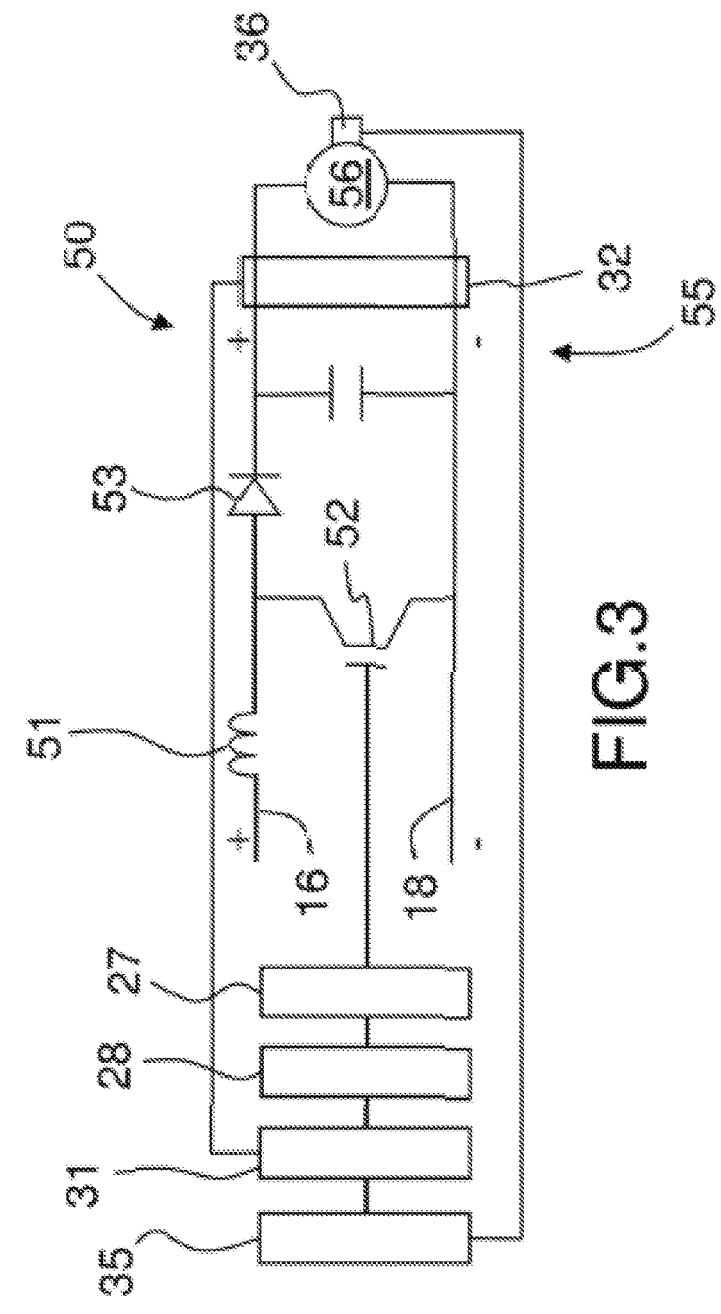

FIGS. 2 and 3 show two direct-direct converters and their respective control equipment. FIG. 2 shows a direct-direct converter 40 operating as a voltage step-down converter. The converter 40 receives energy from a direct network represented by its two terminals 16 and 18, as for the inverter 14. The converter 40 comprises a switch 42 and a diode 43 connected in series between the terminals 16 and 18. An inductor 44 is connected to the common point of the switch 42 and of the diode 43. The other terminal of the inductor 44 forms the positive terminal of an output network 45 powering a charge 46. The negative terminal of the output network 45 is common to the terminal 18 of the direct input network. A filtering capacitor 47 can be connected between the two terminals of the output network 45.

On board an aeroplane, this type of converter can be, for example, implemented in order to charge a 28 V battery from a 540 V HVDC network.

The switch 42 is controlled by a close control module 27, as described above. There is also a pulse width modulator 28, a current control module 31 associated with a current sensor 32 measuring the output current on the network 45, as well as a control module 35 associated with an operation sensor 36 measuring a parameter that is characteristic of the operation of the charge 46.

FIG. 3 shows a direct-direct converter 50 operating as a voltage step-up converter. The converter 50 also receives energy from a direct network represented by its two terminals 16 and 18. The converter 50 comprises an inductor 51 and a switch 52 connected in series between the terminals 16 and 18. A diode 53 is connected by its anode to the common point of the inductor 51 and of the switch 42. The cathode of the diode 53 forms the positive terminal of an output network 55 powering a charge 56. The negative terminal of the output network 55 is common to the terminal 18 of the direct input network. A filtering capacitor 57 can be connected between the two terminals of the network 55.

On board an aeroplane, this type of converter can be, for example, implemented to power a 540 V HVDC network from a 28 V battery.

As in FIGS. 1 and 2, the converter 50 is associated with a pulse width modulator 28, a current control module 31 associated with a current sensor 32 measuring the output current on the network 55, as well as a control module 35 associated with an operation sensor 36 measuring a parameter that is characteristic of the operation of the charge 56.

As is the case for the inverter 14, the converters 40 and 50 are shown in a simplified manner. Any type of converter can implement the invention, as long as it has at least one cyclically controlled switch. More generally, the term "converter" must be understood in its broadest meaning, i.e. any type of electronic circuit comprising at least one cyclically controlled switch. The converters 14, 40 and 50 are called "non-isolated" converters. They do not have galvanic isolation between the input network and the output network.

The invention also can be implemented for converters having galvanic isolation, for example, provided by means of a transformer. By way of an example, patent application FR 3050882 A1, filed in the name of the applicant, discloses a reversible direct-direct converter providing both charging and discharging of a battery in order to provide the power supply for the HVDC network. These converters operate as voltage step-down converters for charging the battery and as step-up converters for powering the HVDC network. This type of converter is known as a BBCU (Buck Boost Converter Unit). The converter disclosed in document FR 3050882 A1 comprises an inverter, a transformer and a static controlled-switch rectifier. The invention can be equally well implemented for the inverter as for the static rectifier.

In order to charge a battery, it is possible for it to be continuously powered with a voltage that is greater than that which it is likely to deliver. However, it is preferable for a charge curve to be provided over time that is adapted to the technology of the battery. This charge curve advantageously is stored in the memory 35a.

Figure 4:
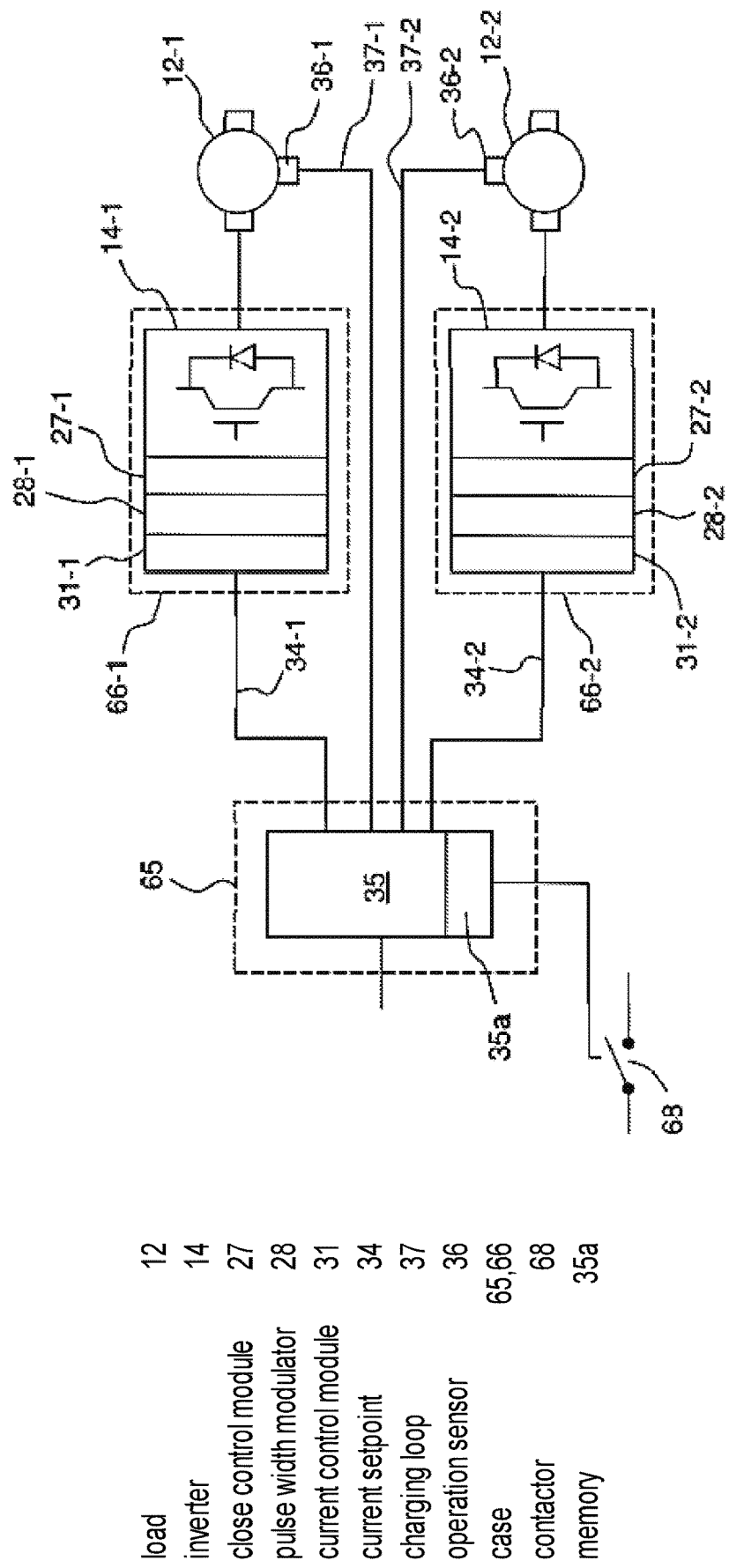
FIGS. 4, 5 and 6 show various embodiments of the invention allowing all or some of the control equipment described with reference to FIG. 1, 2 or 3 to be pooled.

FIG. 4 shows a first embodiment of the invention allowing the module 35 to be pooled. In FIG. 4, two charges 12-1 and 12-2 are each powered by an inverter, respectively 14-1 and 14-2, similar to the inverter 14 described above with reference to FIG. 1. It is clearly understood that this embodiment also can be implemented for any type of converter, particularly those shown in FIGS. 2 and 3. Each inverter is associated with a close control module, respectively 27-1 and 27-2, a pulse width modulator, respectively 28-1 and 28-2, and a current loop, represented herein by its current control module, respectively 31-1 and 31-2. The close control modules 27-1 and 27-2 are similar to the control module 27, the modulators 28-1 and 28-2 are similar to the modulator 28 and the current loops are similar to the current loop 37. In the embodiment of FIG. 4, the control module 35 is common to the two charges 12-1 and 12-2. Each of the charges 12-1 and 12-2 is associated with an operation sensor, respectively 36-1 and 36-2, similar to the sensor 36 described above and each measuring a parameter that is characteristic of the operation of the charge with which the sensor is associated. Two charging loops 37-1 and 37-2, similar to the loop 37, are present. The module 35 belongs to two charging loops 37-1 and 37-2. The embodiment of FIG. 4 can be implemented for more than two inverters, still with a module 35 that is common to the various inverters. The module 35 can comprise different control rules adapted to the operation of each of the inverters 14-1 and 14-2. It is also possible to propose a plurality of control rules for the same inverter, in particular, when it is intended to operate reversibly.

Figure 5:
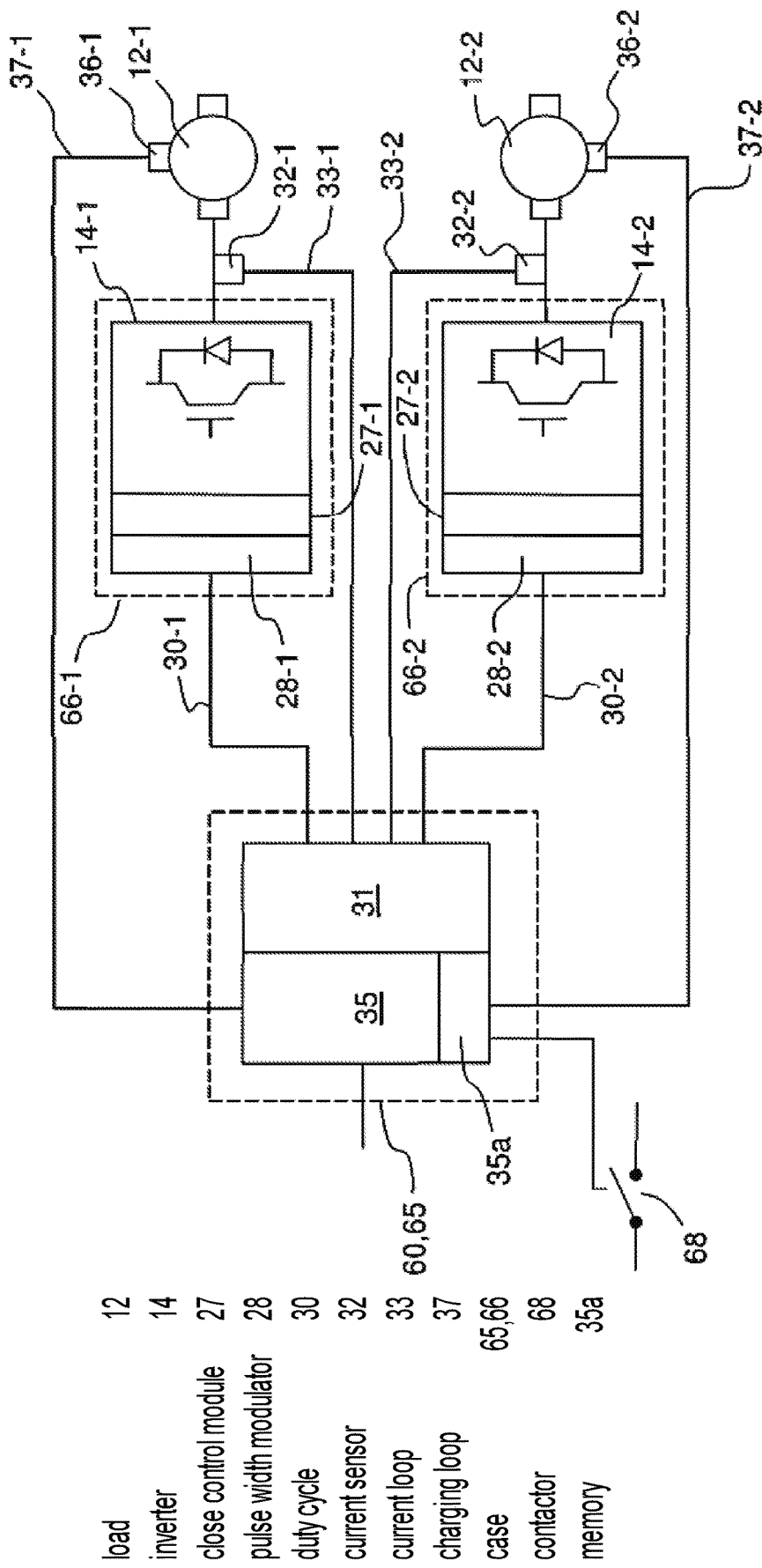

FIG. 5 shows a second embodiment of the invention allowing pooling of the modules 31 and 35 consolidated in a control module 60 that is common to the two inverters 14-1 and 14-2. As in FIG. 4, in the embodiment of FIG. 5, the control module 60 can be common to a greater number of inverters. Each inverter 14-1 and 14-2 is associated with the close control modules 27-1 and 27-2 and the pulse width modulators 28-1 and 28-2. In the embodiment of FIG. 5, two current loops 33-1 and 33-2 similar to the loop 33 are shown. Each current loop 33-1 and 33-2 comprises a current sensor, respectively 32-1 and 32-2, similar to the sensor 32 described above. The module 31 is common to the two current loops 33-1 and 33-2. The charging loops 37-1 and 37-2 and the module 35 belonging to these two loops are also present.

Figure 6:
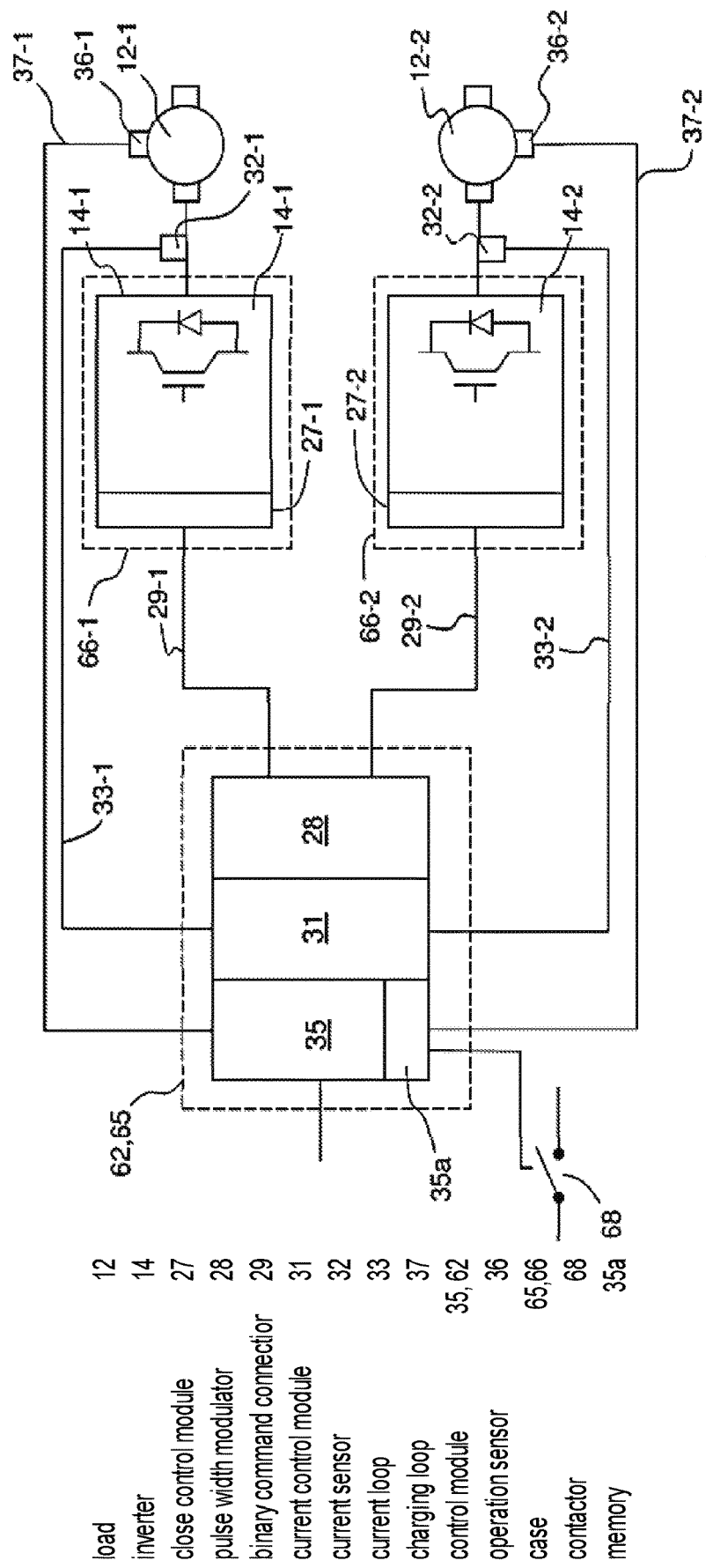

FIG. 6 shows a third embodiment of the invention, in which a control module 62 comprises the modules 31 and 35, as well as a pulse width modulator 28 common to the various inverters 14-1 and 14-2. As previously, two inverters 14-1 and 14-2 are shown. It is clearly understood that the control module 62 can be common to a greater number of inverters. The close control modules 27-1 and 27-2 remain associated with each of the inverters 14-1 and 14-2.

The control module 62 can be at a distance from the close control modules 27-1 and 27-2. The connections carrying the binary commands originating from the modulator 28 to the close control modules 27-1 and 27-2 are herein respectively referenced 29-1 and 29-2. The distance from the control module 62 in relation to the inverters 14-1 and 14-2 and to their close control module 27-1 and 27-2 allows the power part of the electrical architecture to be spatially separated from the control part. More specifically, the distance allows separation, on the one hand, of the module common to the various converters and, on the other hand, of the converters themselves that are each associated with their close control module and optionally with the modules 27-1, 27-2, 28-1 and 28-2. A physical barrier can be provided in order to separate the power part of the electrical architecture from the control part. For example, it is possible to dispose the module common to the various converters in a case 65. The converters that are each associated with their close control module, and optionally the modules 27-1, 27-2, 28-1 and 28-2, are then each disposed in a case, respectively 66-1 and 66-2, that is distinct from that which is reserved for the common module. Thus, in the event of a thermal, mechanical or electrical malfunction of the power part, the probability of the malfunction propagating into the control part is significantly reduced. The distance is also of interest in the embodiments of FIGS. 4 and 5. In the embodiment of FIG. 4, the modules 27-1, 28-1 and 31-1 remain disposed in the vicinity of the inverter 14-1 and the module 35 is at a distance from the modules 27-1, 28-1 and 31-1. The same applies to the modules 27-2, 28-2 and 31-2, which are at a distance from the module 35. In the embodiment of FIG. 5, the control module 60 is at a distance from the inverters and the modules 27-1 and 28-1, on the one hand, and 27-2 and 28-2, on the other hand.

On board an aeroplane, it is possible, for example, for the inverters and their close control module to be disposed as close as possible to the charges, for example, in non-pressurized zones, and for the control module 35 or 60 or 62 to be disposed in a pressurized zone. Thus, the environmental constraints that the control module has to withstand are less severe than if this module is disposed in the vicinity of the charge, i.e. in a non-pressurized zone.

In the embodiment of FIG. 6, the connections 29-1 and 29-2 can comprise optical fibres. The optical fibres provide galvanic isolation for each of the inverters 14-1 and 14-2 and for its close control module, respectively 27-1 and 27-2, in relation to the control module 62.

As for the first embodiment, the second and the third embodiment also can be implemented for any type of converter, particularly those shown in FIGS. 2 and 3.

In the three embodiments of FIGS. 4 to 6, the modules 35, 60 and 62 are intended to independently control converters. To this end, the module common to the various converters comprises a real-time operating system providing separation of channels associated with each of the converters. When applied to the aeronautical field, the operating system advantageously complies with standard DO 297.

On board an aeroplane, each of the engines is associated with a main generator providing most of the supply of electrical energy when the aeroplane is in flight. A control device known as a GCU (Generator Control Unit) is associated with each of the generators. The GCU operates throughout the mission of the aeroplane as soon as its engines are in operation. The GCU is mainly formed by an exciter controlled by a static converter, for which the invention can be implemented. The GCU also can comprise line contactors allowing the generator to be connected to or isolated from the on-board electrical network. Even though it does not operate cyclically like the switches of a converter, the contactors of the GCU can be controlled by the module 35 associated with the converter of the GCU. Any other contactor 68 can be controlled by the module 35.

More generally, the module 35 can control any type of contactor, whether or not it operates cyclically. By way of an example, on board an aeroplane, it is common practice for a power network control unit to be provided. This unit is known as BPCU (Bus Power Control Unit). The BPCU particularly allows one of the power networks of the aeroplane to be connected or disconnected. A module 35 can control the contactors of the BPCU. On board an aeroplane, it is important to ensure that these contactors operate correctly. Auxiliary devices belonging to the BPCU can monitor the open or closed state of the contactors. This monitoring can be stored, for example, in the memory 35a of the module 35 controlling the contactor.

More generally, the memory 35a can be used to store other information, particularly operation data of the controlled switches and even the associated charge. This data can be stored in a rotating table format by overwriting the oldest data.

The invention claimed is:

1. An electrical architecture, comprising:
a plurality of converters operating independently of one another, each converter powering a different load, the loads powered by the plurality of converters being separate from one another,
associated with each converter/load pair: a charging loop, comprising at least one operation sensor measuring a parameter that is characteristic of an operation of the load, an operation control module, receiving an operation setpoint of the load and information originating from the at least one operation sensor, the operation control module controlling a current setpoint of the considered converter so that the information originating from the at least one operation sensor follows the operation setpoint,
associated with each converter: a current loop, comprising at least one current sensor measuring an output current of the considered converter, a current control module, receiving the current setpoint and information originating from the at least one current sensor and delivering an opening and closing duty cycle for electronic switches belonging to the considered converter, the current control module controlling the duty cycle so that information originating from the at least one current sensor follows the current setpoint,
a control module that is common to all of the plurality of converters and comprising the operation control modules and the current control modules of all of the plurality of converters.

2. The electrical architecture according to claim 1, wherein the operation control module comprises a memory allowing storage of a plurality of control rules, each adapted to the operation of one of the plurality of converters.

3. The electrical architecture according to claim 2, wherein the memory is configured to store a charge curve adapted to a battery forming the load associated with the converter.

4. The electrical architecture according to claim 2, wherein the memory is configured to store a torque/speed curve adapted to start an electric motor forming the load associated with the converter.

5. The electrical architecture according to claim 2, wherein the memory is configured to store operation data for controlled switches and/or for the associated load.

6. The electrical architecture according to claim 1, wherein the control module that is common to the plurality of converters comprises a real-time operating system enabling separation of channels associated with each of the plurality of converters.

7. The electrical architecture according to claim 1, further comprising a pulse width modulator that is common to the plurality of converters, receiving a duty cycle and delivering binary commands to the plurality of converters for opening and closing electronic switches of the plurality of converters, and wherein the control module that is common to the plurality of converters further comprises the pulse width modulator.

8. The electrical architecture according to claim 7, further comprising, associated with each converter, a switch control module, called close control module, receiving the binary commands and implementing current and voltage adaptation of the binary commands in order to generate signals adapted to the electronic switches.

9. The electrical architecture according to claim 8, wherein a link connecting the control module and the close control modules is provided by means of optical fibres.

10. The electrical architecture according to claim 1, wherein the control module that is common to all of the plurality of converters is disposed in a case, and wherein the plurality of converters are each disposed in a second case that is distinct from the case containing the operation control module.

11. The electrical architecture according to claim 7, wherein the control module that is common to all of the plurality of converters is disposed in a case, and wherein the plurality of converters are each disposed in a second case that is distinct from the case containing the operation control module.

12. The electrical architecture according to claim 1, further comprising at least one contactor distinct from the plurality of converters, and wherein the operation control module controls the contactor.

13. The electrical architecture according to claim 1, wherein the separation comprises each of the plurality of converters being in a different case.

14. An aircraft, comprising an electrical architecture, which comprises:

a plurality of converters operating independently of one another, each converter powering a different load, the loads powered by the plurality of converters being separate from one another, associated with each converter/load pair: a charging loop, comprising at least one operation sensor measuring a parameter that is characteristic of an operation of the load, an operation control module, receiving an operation setpoint of the load and information originating from the at least one operation sensor, the operation control module controlling a current setpoint of the considered converter so that the information originating from the at least one operation sensor follows the operation setpoint, associated with each converter: a current loop, comprising at least one current sensor measuring an output current of the considered converter, a current control module, receiving the current setpoint and information originating from the at least one current sensor and delivering an opening and closing duty cycle for electronic switches belonging to the considered converter, the current control module controlling the duty cycle so that information originating from the at least one current sensor follows the current setpoint, a control module that is common to all of the plurality of converters and comprising the operation control modules and the current control modules of all of the plurality of converters, wherein the control module that is common to all of the plurality of converters is disposed in a pressurized zone of the aircraft and wherein at least one of the plurality of converters is disposed in a non-pressurized zone of the aircraft.

* * * * *